US012736333B2

(12) United States Patent
Trickey et al.

(10) Patent No.: US 12,736,333 B2
(45) Date of Patent: Sep. 15, 2026

(54) APPARATUS FOR RECOVERING TWIST IN CABLE SHAPE

(71) Applicant: The Government of the United States of America, Arlington, VA (US)

(72) Inventors: Stephen T. Trickey, Arlington, VA (US); Brandon F. Redding, University Park, MD (US); Joseph B. Murray, Ellicott City, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 129 days.

(21) Appl. No.: 18/738,325

(22) Filed: Jun. 10, 2024

(65) Prior Publication Data

US 2025/0237499 A1 Jul. 24, 2025

Related U.S. Application Data

(60) Provisional application No. 63/622,199, filed on Jan. 18, 2024.

(51) Int. Cl.
*G01B 11/255* (2006.01)
*G01B 11/16* (2006.01)
*G01L 1/24* (2006.01)

(52) U.S. Cl.
CPC ............ *G01B 11/255* (2013.01); *G01B 11/16* (2013.01); *G01L 1/242* (2013.01)

(58) Field of Classification Search
CPC ........ G01B 11/16; G01B 11/255; G01L 1/242
See application file for complete search history.

(56) References Cited

U.S. PATENT DOCUMENTS 5,633,494 A * 5/1997 Danisch ............. G01D 5/35377 250/227.16
10,317,196 B2 6/2019 Laine et al.
(Continued)

OTHER PUBLICATIONS

Moore, J. P. et al., "Shape sensing using multi-core fiber optic cable and parametric curve solutions," Optics Express, Jan. 24, 2012, pp. 2967-2973, vol. 20, Issue 3, Optica Publishing Group, Washington, DC, USA.

(Continued)

*Primary Examiner* — Tri T Ton
(74) *Attorney, Agent, or Firm* — US Naval Research Laboratory; Suresh Koshy

(57) ABSTRACT

An apparatus for recovering an angle of twist in a cable shape includes a cable. The apparatus includes at least three curvature sensors located at at least three respective curvature sensor positions along the length of the cable and generating respective curvature values at the at least three respective curvature sensor positions. The apparatus includes at least one position sensor along the length of the cable and generating at least one positional value. The apparatus includes a processor receiving the respective curvature values from the at least three curvature sensors and receiving the respective measured positional value from the at least one position sensor. The processor recovers at least three respective angles of twist at the at least three respective curvature sensor positions at least based on the respective curvature values and the at least one respective measured positional value.

5 Claims, 14 Drawing Sheets

(56) References Cited

U.S. PATENT DOCUMENTS

| | | | | |
|---|---|---|---|---|
| 10,378,885 | B2 * | 8/2019 | Froggatt | G01M 11/025 |
| 2003/0072515 | A1 * | 4/2003 | Ames | G01V 1/201<br>385/12 |
| 2021/0109245 | A1 * | 4/2021 | Jung | G01V 1/159 |

OTHER PUBLICATIONS

Xiang Yan et al., “A sensor for the direct measurement of curvature based on flexoelectricity,” Smart Materials and Structures, Jul. 11, 2013, vol. 22, No. 8, IOP Publishing Ltd., Bristol, United Kingdom.

Westbrook, P.S. et al., “Continuous multicore optical fiber grating arrays for distributed sensing applications,” Journal of Lightwave Technology, Mar. 15, 2017, pp. 1248-1252, vol. 35, Issue 6, IEEE, Piscataway, NJ, USA.

Berger, Perrine, et al., RF Spectrum Analyzer for Pulsed Signals: Ultra-Wide Instantaneous Bandwidth, High Sensitivity, and High Time-Resolution, Journal of Lightwave Technology, Oct. 15, 2016, pp. 4658-4663, vol. 34, No. 20, Optical Society and the IEEE Photonics Society, Washington, DC, USA.

Sefler, George A., et al., Demonstration of speckle-based compressive sensing system for recovering RF signals, Optics Express, Aug. 20, 2018, pp. 21390-21402, vol. 26, No. 17, Optica, Washington, DC, USA.

Wan, Yangyang, et al., Wavemeter Capable of Simultaneously Achieving Ultra-High Resolution and Broad Bandwidth by Using Rayleigh Speckle From Single Mode Fiber, Journal of Lightwave Technology, Apr. 1, 2021, pp. 2223-2229, vol. 39, No. 7, Optical Society and the IEEE Photonics Society, Washington, DC, USA.

* cited by examiner

APPARATUS FOR RECOVERING TWIST IN CABLE SHAPE

CROSS-REFERENCE TO RELATED APPLICATIONS

This application is a Non-provisional of, and claims the benefit of priority under 35 U.S.C. § 119 based on, U.S. Provisional Patent Application No. 63/622,199 filed 18 Jan. 2024. The Provisional Application and all references cited herein are hereby incorporated by reference into the present disclosure in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case No. 211,956-US2.

BACKGROUND OF THE INVENTION

Aspects of the present invention relate generally to an apparatus for cable shape sensing and, more particularly, to an apparatus for recovering an angle of twist of a cable's shape.

Cable shape sensing is essential for a variety of applications including, for example, surgical guidance, robotics, undersea tether monitoring, and array element location.

The shape of a cable can be determined using differential geometry, if the local curvature is known all along the cable. The curvature can be calculated by measuring the differential strain at opposite sides of the cable induced by bending. Conventional calculations of curvature use optical fibers and several possible measurement techniques to recover strain such as using fiber Bragg gratings, Rayleigh backscatter, or Brillouin based strain measurements. Equally important for correct shape recovery is knowledge of the local rotational orientation of the cable or angle of twist all along the cable which describes which direction the cable is bending in a global coordinate system. With knowledge of the local curvature and orientation, the three dimensional shape of the cable can be recovered using the Frenet-Serret system of ordinary differential equations.

Measuring cable twist is a long-standing challenge in optical shape sensing. In conventional devices or methods, twist is recovered by monitoring strain on the sensing fibers. For example, consider a cable containing one central fiber surrounded by six fibers in a hexagonal pattern. If the cable twists, the outer fibers will experience strain, while the central fiber will be unaffected. The relative strain between the outer fibers and the central fiber can then be used to infer the twist. Unfortunately, this approach provides only modest sensitivity to twist, leading to insufficient accuracy for most applications. To increase the sensitivity, the outer fibers can be arranged in a helixed geometry. However, this modified approach increases the fabrication complexity and the overall optical path-length of the fiber. The measured strain uncertainty increasing with the length of the fiber reduces the overall accuracy of the shape sensing system. In addition, this requires an interrogation system with very high spatial resolution (e.g., a factor of 10 less than the helixing pitch, which can be ~cm). Such high spatial resolution can be achieved for short ranges, but at the cost of increased strain uncertainty which translates to less accurate measurements of curvature and thus of shape. Moreover, such high-resolution is particularly challenging in long cables (e.g. >100 m) due to the number of discrete sensing locations required. As a result, there is no currently known satisfactory method to recover twist in shape sensing cables over long ranges, and this has been one of the primary challenges precluding the realization of long range shape sensing.

SUMMARY OF THE INVENTION

An embodiment of the invention includes an apparatus for recovering the angle of twist as a function of cable length in long length under water cable shape sensing applications using an independent data source in the form of depth or z-axis cable location. Recovering the angle of twist is crucial to correctly determining the three dimensional shape of the cable.

An embodiment of the invention uses additional data source to setup minimization problem to solve for twist angle. For example, the use of the additional data source does not include using relative strain measurements to derive twist. For example, the additional data source provides $z_{depth}(s)$, i.e., an independent z-axis input as a function of distance(s) along a cable's length. This embodiment of the invention uses a shape recovery process to recover z-axis component of shape $R_z(s)$, which depends on κ, $\theta_{twist}$, where κ (or kappa) is the cable's curvature in the x-axis and y-axis dimensions and $\theta_{twist}$ is the cable's angle of twist. This embodiment of the invention further determines the twist angle, $\theta_{twist}(s)$, that minimizes the error between $R_z(s)$ and $z_{depth}(S)$.

An embodiment of the invention includes an apparatus for recovering an angle of twist in a cable shape. The apparatus includes a cable. The cable includes a length. The apparatus includes at least three curvature sensors located at at least three respective curvature sensor positions along the length of the cable and generating respective curvature values at the at least three respective curvature sensor positions. The apparatus includes at least one position sensor along the length of the cable and generating at least one positional value. The apparatus includes a processor receiving the respective curvature values from the at least three curvature sensors and receiving the respective measured positional value from the at least one position sensor. The processor recovers at least three respective angles of twist at the at least three respective curvature sensor positions at least based on the respective curvature values and the at least one respective measured positional value.

Another embodiment of the invention includes an apparatus for recovering an angle of twist in a cable shape. The apparatus includes a cable. The cable includes a length. The apparatus includes at least three curvature sensors located at at least three respective curvature sensor positions along the length of the cable and generating respective curvature values at the at least three respective curvature sensor positions. The apparatus includes at least one heading sensor located along the length of the cable and generating a respective measured orientation value. The apparatus includes a processor receiving the respective curvature values from the at least three curvature sensors and receiving the respective measured orientation value from the at least one heading sensor. The processor recovers at least three respective angles of twist at the at least three respective curvature sensor positions at least based on the respective curvature values and the at least one respective measured orientation value.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
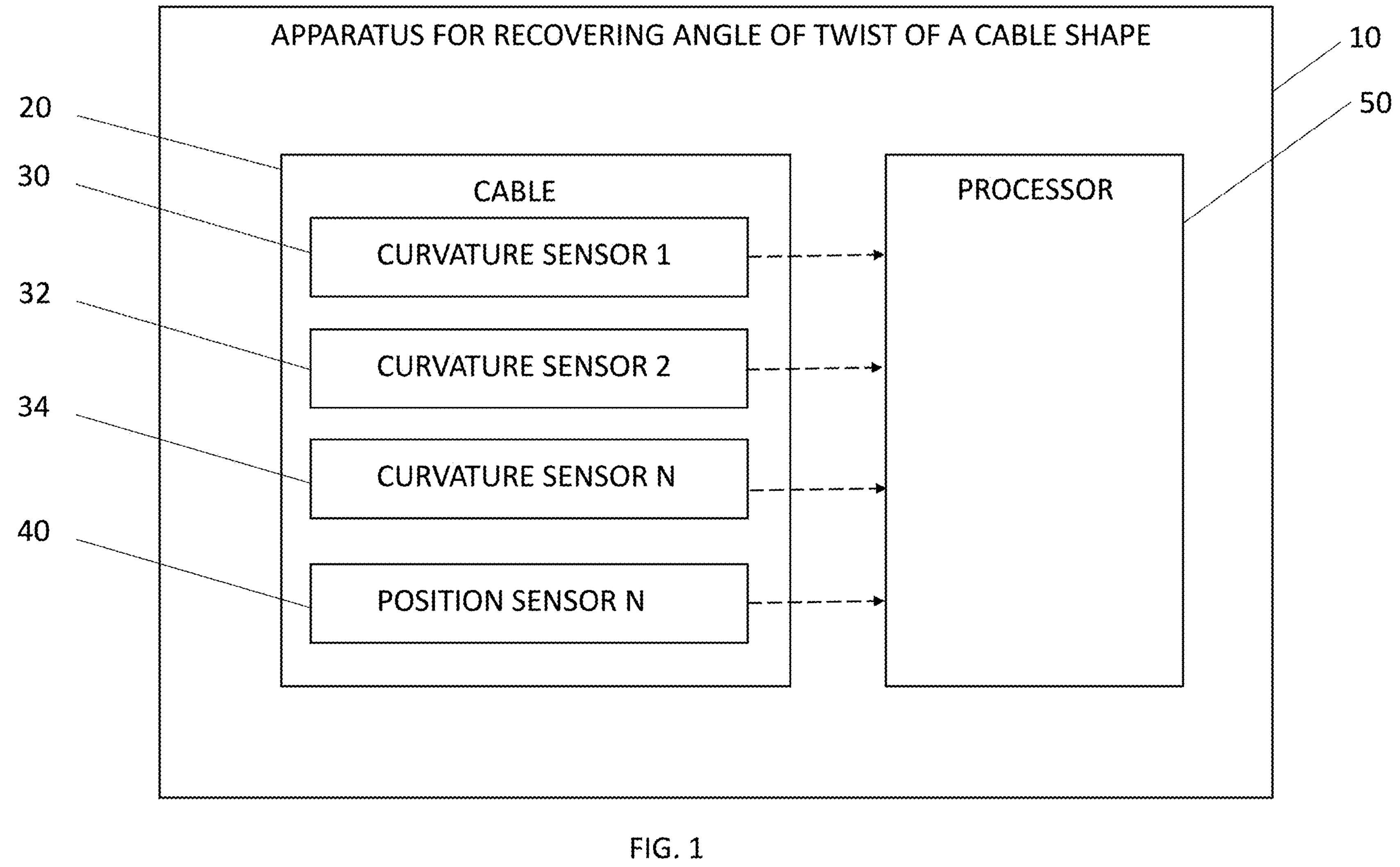
FIG. 1 is a block diagram of an embodiment of the invention.

An embodiment of the invention includes an apparatus 10 for recovering an angle of twist in a cable shape, is described as follows, and is shown by way of illustration in FIG. 1. The apparatus 10 includes a standard cable 20. The cable 20 includes a length. The apparatus 10 includes at least three standard curvature sensors 30, 32, 34 located at at least three respective curvature sensor positions along the length of the cable 20 and generating respective curvature values at the at least three respective curvature sensor positions. For the purpose of this patent application, "curvature" is a term of art and describes the magnitude and direction of curvature from the frame of reference of the cable. As such, the curvature can be decomposed into \kappa_x and \kappa_y, each in units of 1/m and describing the radius of curvature in the x-axis and y-axis with respect to the cable orientation. For example, an embodiment of the invention including a 100 meter cable includes 10s to 100s of curvature sensors along the cable. The apparatus 10 includes at least one standard position sensor 40 along the length of the cable 20 and generating at least one positional value, or sensor's position. For the purpose of this patent application, "sensor's position" is a term of art and is defined as the distance of the position sensor from a cable end. The sensor's position is, for example, given in Cartesian (i.e., global) space along at least one axis. In an embodiment of the invention, the at least one axis is height or depth, i.e., a z-axis value. In another embodiment of the invention, the at least one axis includes an x-axis value and a y-axis value. The sensor's position is, for example, given in units of meters. In an embodiment of the invention, the at least one position sensor need not be respectively co-located with one or more of the curvature sensors. For example, the at least one position sensor includes a plurality of position sensors. The positions sensors are located at discrete positions along the length of the cable.

The apparatus 10 includes a standard processor 50 receiving the respective curvature values from the at least three curvature sensors 30, 32, 34 and receiving the respective measured positional value from the at least one position sensor 40. The processor 50 recovers at least three respective angles of twist at the at least three respective curvature sensor positions at least based on the respective curvature values and the at least one respective measured positional value. For the purpose of this patent application, "angle of twist" at a sensor's position along a cable is a term of art and is defined as the local rotational orientation of the cable at that sensor position. In other words, the "angle of twist" describes which direction the cable is bending in a global coordinate system.

Optionally, the cable 20 includes a cable shape. The processor 50 recovers the at least three angle of twists at the respective curvature sensor positions at least as follows. A naive estimate of the cable shape is generated by the processor 50, based on the respective curvature values and in a manner or process free of the at least one respective measured positional value. For example, the naïve estimate is generated by using standard Frenet-Serret formulae in a standard manner to determine the geometry of the cable in three-dimensional space, such as described in MOORE, J. P. et al., "Shape sensing using multi-core fiber optic cable and parametric curve solutions," Optics Express, 24 Jan. 2012, pp. 2967-2973, Vol. 20, Issue 3, Optica Publishing Group, Washington, DC, USA, incorporated herein by reference. The determined geometry of the cable includes expected positional values (or, in other embodiments of the invention, expected orientation values) along the length of the cable. Expected positional values are generated by the processor 50, based on the naïve estimate of the cable shape. The naïve estimate of the cable shape is corrected by the process, by minimizing an error between the expected positional values based on the naïve estimate of the cable shape and the at least one respective measured positional value.

Figure 2B:
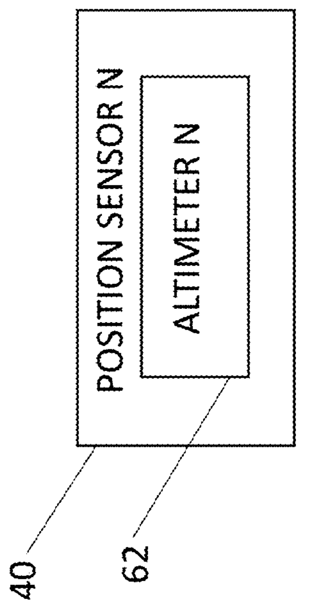
FIG. 2B is a block diagram of another position sensor according to an embodiment of the invention.
Figure 2A:
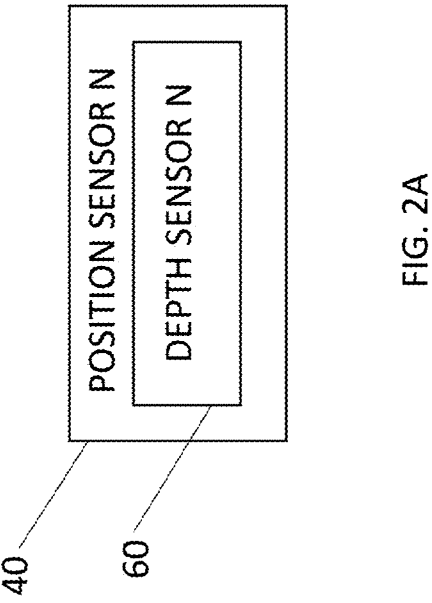
FIG. 2A is a block diagram of a position sensor according to an embodiment of the invention.

Optionally, in an embodiment of the invention, such as shown by way of illustration in FIG. 2A, the at least one position sensor 40 includes at least one depth sensor 60, wherein the respective measured positional value is a respective measured depth value. Optionally, in another embodiment of the invention, such as shown by way of illustration in FIG. 2B, the at least one position sensor 40 includes at least one altimeter 62, wherein the respective measured positional value is a respective measured height value.

Figure 3:
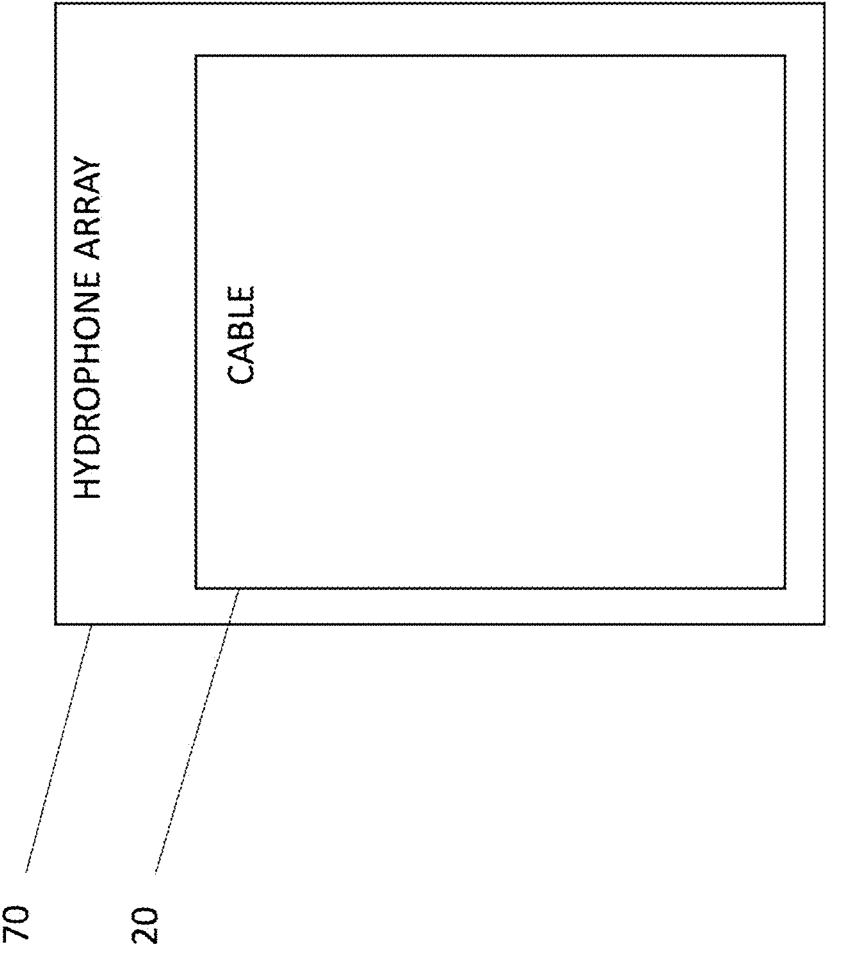
FIG. 3 is a block diagram of a hydrophone array including a cable according to an embodiment of the invention.
Figure 4:
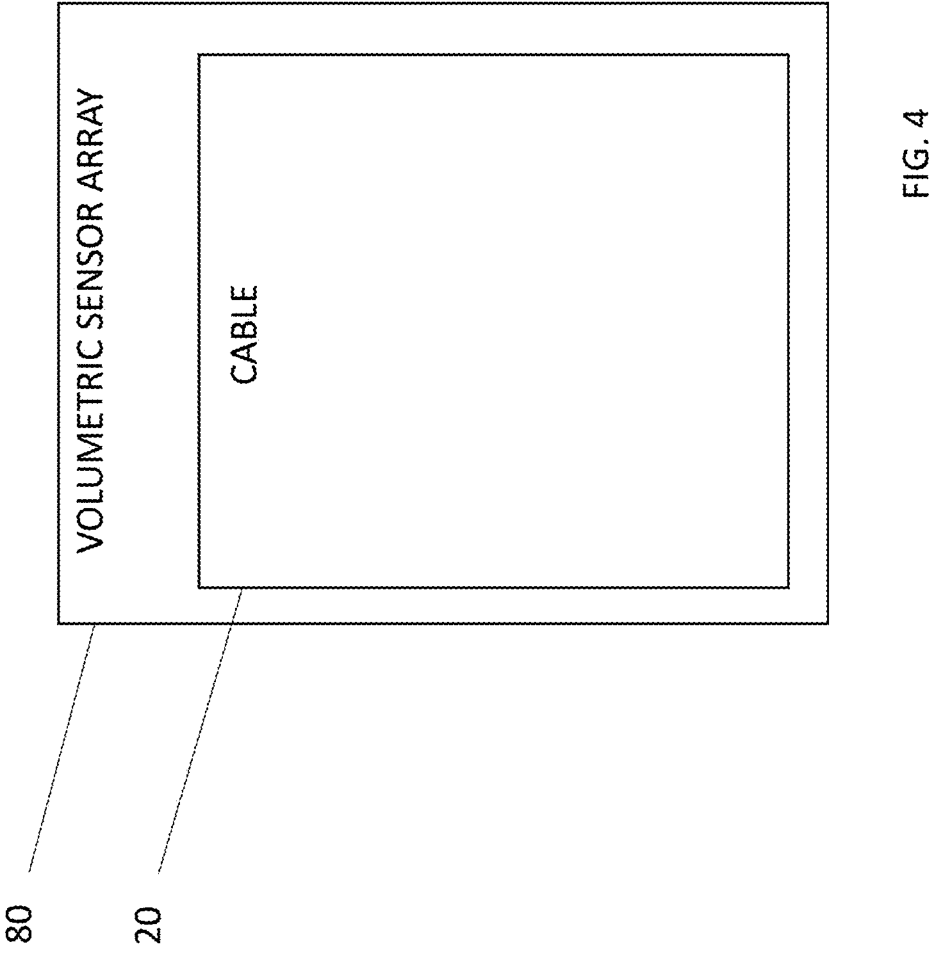
FIG. 4 is a block diagram of a volumetric sensor array including a cable according to an embodiment of the invention.
Figure 5:
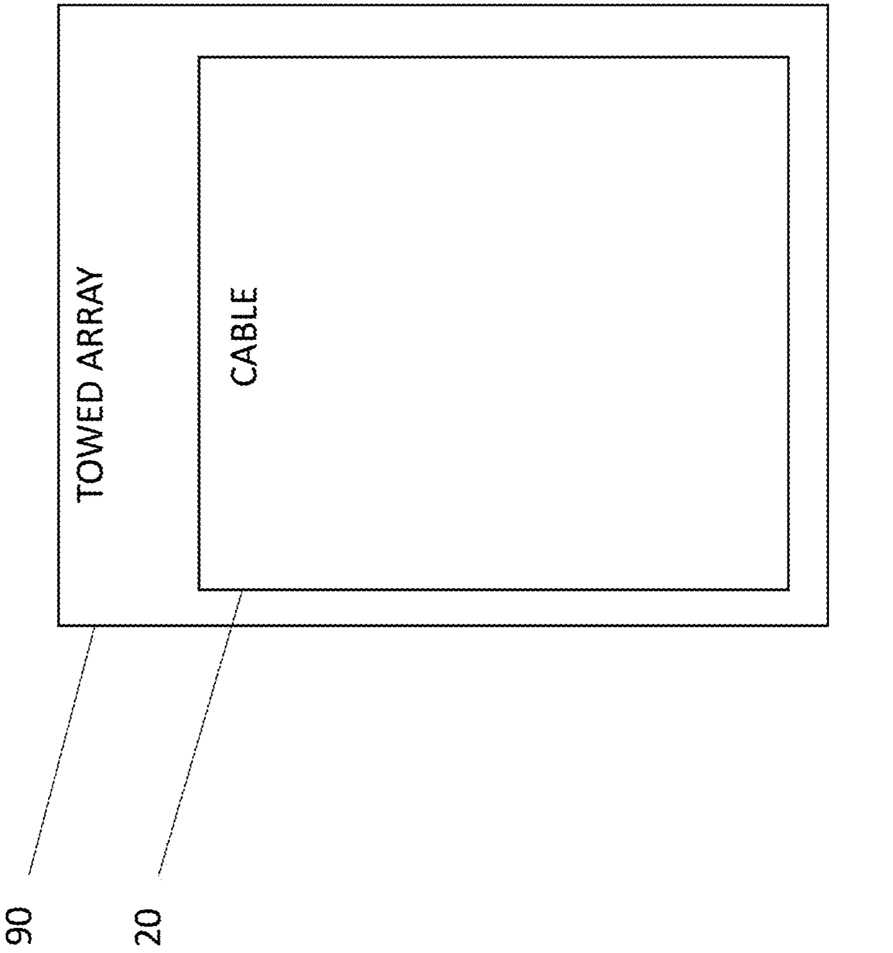
FIG. 5 is a block diagram of a towed array including a cable according to an embodiment of the invention.
Figure 6:
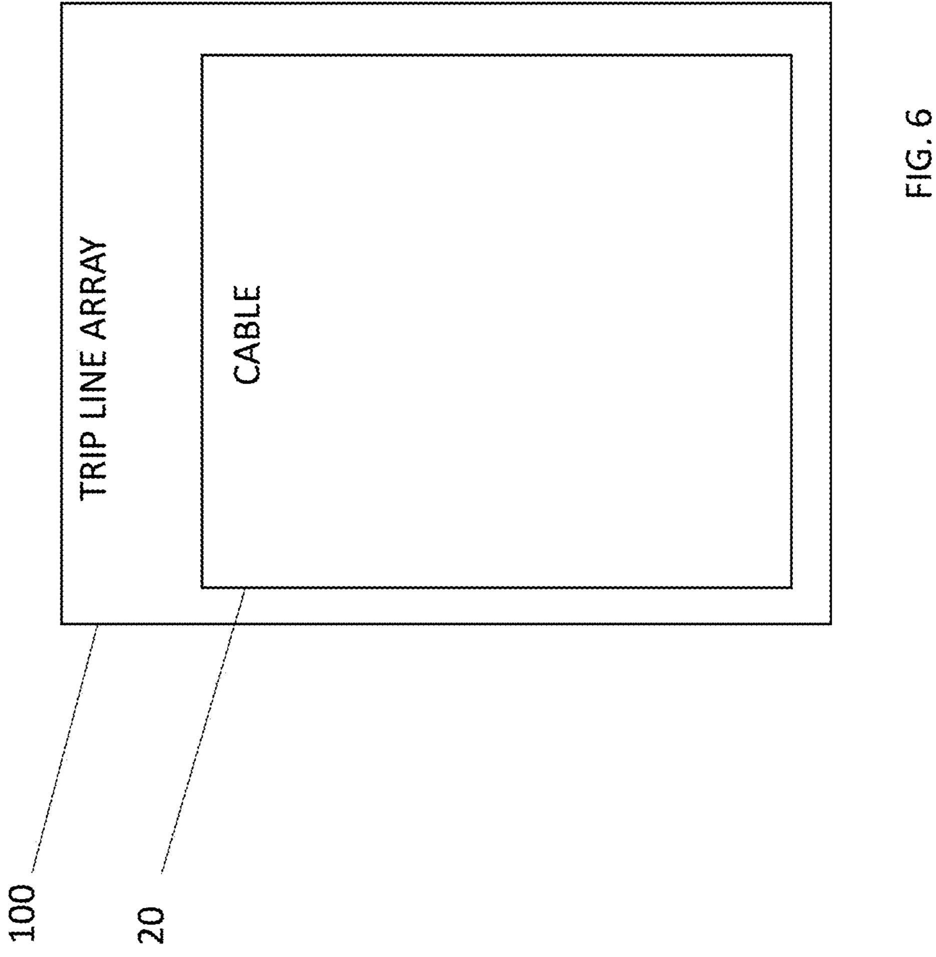
FIG. 6 is a block diagram of a trip line array including a cable according to an embodiment of the invention.
Figure 7:
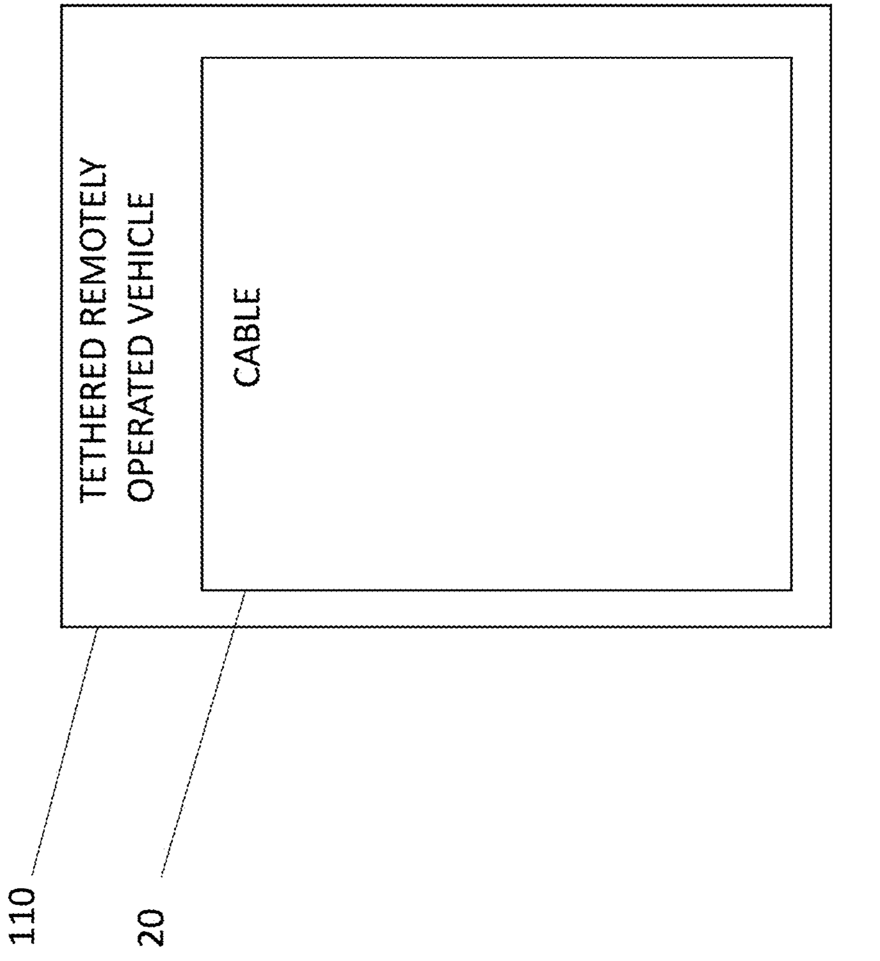
FIG. 7 is a block diagram of a tethered remotely operated vehicle including a cable according to an embodiment of the invention.

Optionally, the apparatus 10 further includes a standard hydrophone array 70 including the cable, such as shown by way of illustration in FIG. 3; a standard volumetric sensor array 80 including the cable, such as shown by way of illustration in FIG. 4; a standard towed array 90 including the cable, such as shown by way of illustration in FIG. 5; a standard trip line array 100 including the cable, such as shown by way of illustration in FIG. 6; or a standard tethered remotely operated vehicle 110 including the cable, such as shown by way of illustration in FIG. 7.

Figure 8B:
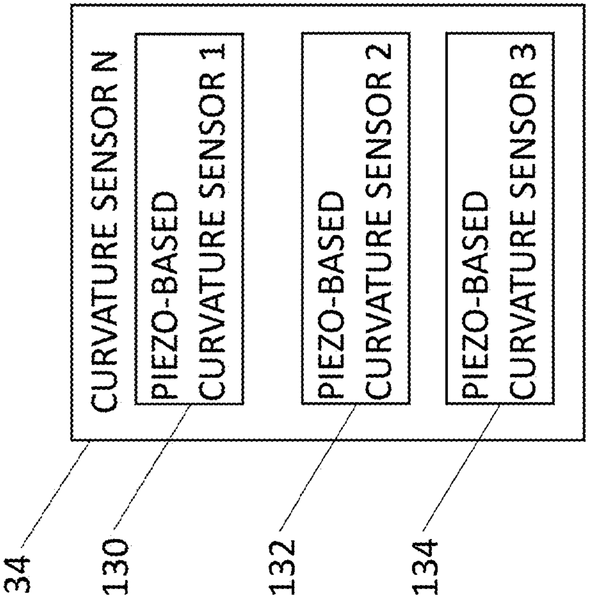
FIG. 8B is a block diagram of another curvature sensor according to an embodiment of the invention.
Figure 8A:
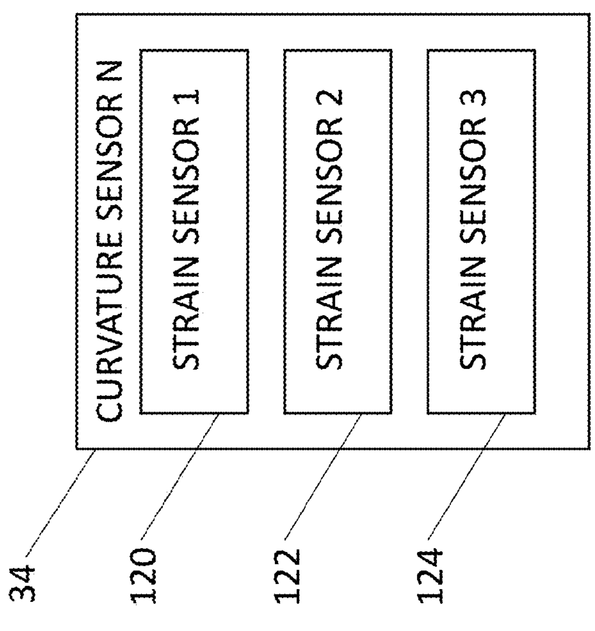
FIG. 8A is a block diagram of a curvature sensor according to an embodiment of the invention.

Optionally, each curvature sensor 34 of the at least three curvature sensors includes three standard, strain sensors 120, 122, 124, such as shown in by way of illustration in FIG. 8A, or three standard, piezo-based curvature sensors 130, 132, 134, such as shown by way of illustration in FIG. 8B. Examples of strain sensors in one or more embodiments of the invention include standard fiber Bragg gratings, standard Rayleigh backscatter sensors, and/or standard Brillouin-based strain sensors. In an embodiment of the invention, the curvature value at each curvature sensor is determined by three strain measurements taken by (at least) three strain sensors. For example, the three strain sensors for each curvature sensor of three curvature sensors would produce nine strain measurements to determine the three curvature values at the three curvature sensors. An example of a piezo-based curvature sensor according to an embodiment of the invention is described in XIANG YAN et al., "A sensor for the direct measurement of curvature based on flexoelectricity," Smart Materials and Structures, 11 Jul. 2013, Volume 22, Number 8, IOP Publishing Ltd., Bristol, United Kingdom, which is incorporated herein by reference.

Figure 9:
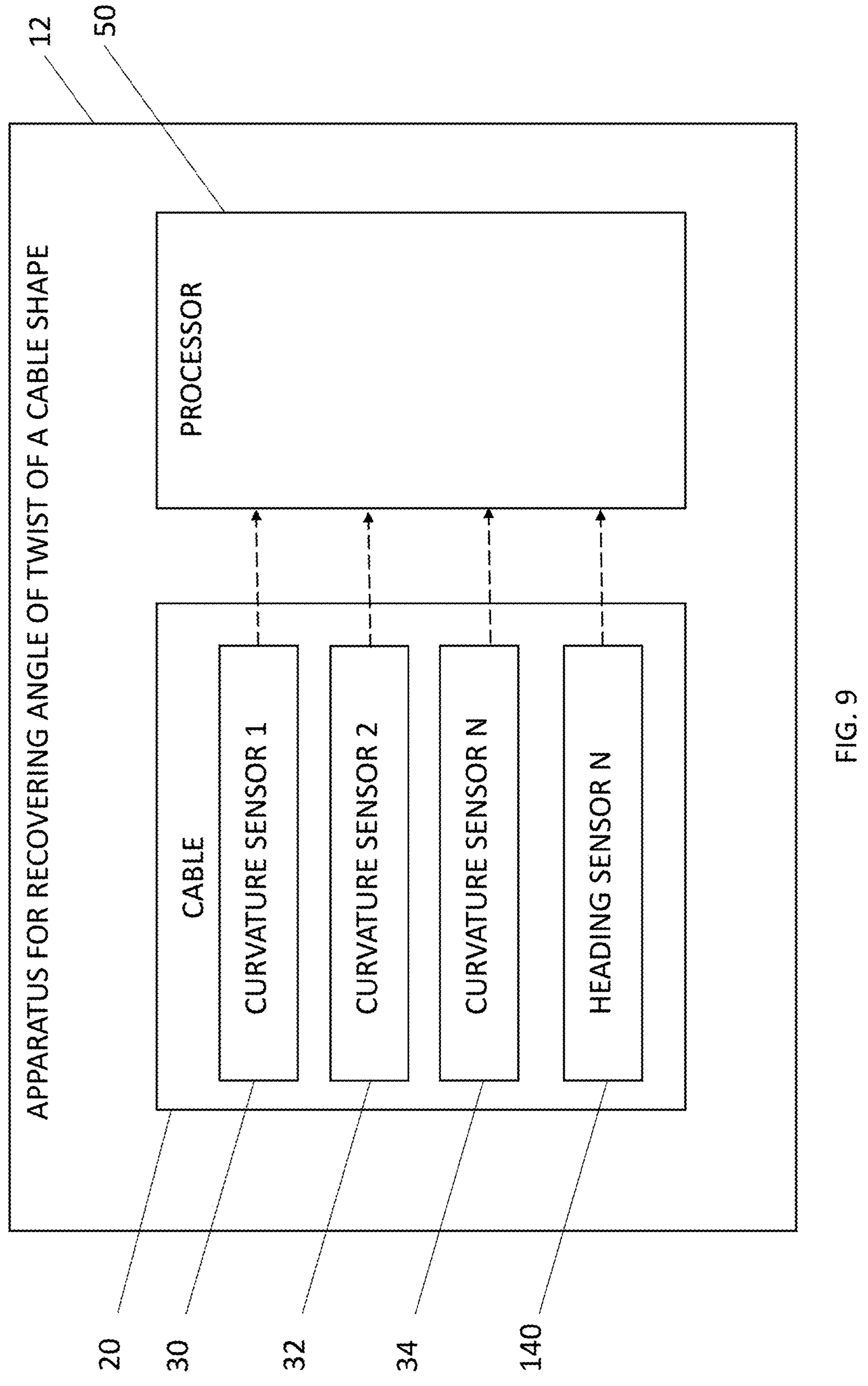
FIG. 9 is a block diagram of another embodiment of the invention.

Another embodiment of the invention includes an apparatus 12 for recovering an angle of twist in a cable shape, is described as follows, and is shown by way of illustration in FIG. 9. The apparatus 12 includes a cable 20. The cable 20 includes a length. The apparatus 12 includes at least three standard curvature sensors 30, 32, 34 located at at least three respective curvature sensor positions along the length of the cable and generating respective curvature values at the at least three respective curvature sensor positions. The apparatus 12 includes at least one standard heading sensor 140 located along the length of the cable and generating a respective measured orientation value. The apparatus 12 includes a standard processor 50 receiving the respective curvature values from the at least three curvature sensors 30, 32, 34 and receiving the respective measured orientation value from the at least one heading sensor 140. The processor 50 recovers at least three respective angles of twist at the at least three respective curvature sensor positions at least based on the respective curvature values and the at least one respective measured orientation value.

Figure 10:
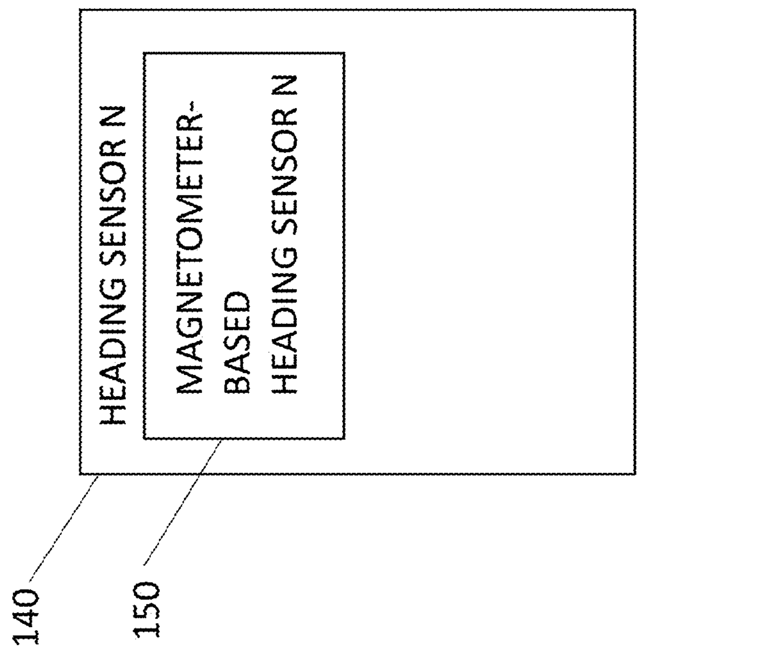
FIG. 10 is a block diagram of a heading sensor according to an embodiment of the invention.

Optionally, the respective measured orientation value is a respective measured slope value. In an embodiment of the invention, such as shown by way of illustration in FIG. 10, the at least one heading sensor 140 includes a standard magnetometer-based heading sensor 150.

Optionally, the cable 20 includes a cable shape. The processor 50 recovers the at least three angle of twists at the respective curvature sensor positions by at least the following. A naive estimate of the cable shape is generated based on the respective curvature values and free of the at least one respective measured orientation value. Expected orientation values are generated based on the naïve estimate of the cable shape. The naïve estimate of the cable shape is corrected by minimizing an error between the expected orientation values based on the naïve estimate of the cable shape and the at least one respective measured orientation value.

Optionally, as shown by way of illustration in FIGS. 3-7, the apparatus 12 further includes a standard hydrophone array 70 including the cable 20; a standard volumetric sensor array 80 including the cable 20; a standard towed array 90 including the cable 20; a standard trip line array 100 including the cable 20; or a standard tethered remotely operated vehicle 110 including the cable 20.

Optionally, as shown by way of illustration in FIGS. 8A-8B, each curvature sensor of the at least three curvature sensors includes three standard strain sensors or three standard piezo-based curvature sensors.

In another embodiment of the invention, rather than attempting to calculate twist from the relative strain between the outer fibers and a central fiber in a standard cable, an additional data source is used to solve for the twist angle. This embodiment of the invention is, for example, compatible with undersea sensing in which the depth of the fiber can be inferred from the hydrostatic pressure induced strain on the fiber. Measuring the curvature and the depth at each position along a cable, using this embodiment of the invention, provides sufficient information to recover the twist along the cable. Quantitatively, the position-dependent twist, $\theta_{twist}$ is determined, for example, by:

$$\underset{\theta_{twist}(s)}{\operatorname{argmin}} \|R_z(s) - z(s)\| \quad [1]$$

where s is the position along the cable, $R_z$ is the z-coordinate of the recovered cable shape using the measured curvature and a given $\theta_{twist}$, and z is the true z-coordinate of the cable as measured from the hydrostatic pressure.

Algorithmically, other embodiments of the invention employ alternative techniques to recover $\theta_{twist}$, such as standard non-linear optimization algorithms, standard heuristic approaches, and standard machine learning algorithms. More broadly, this approach is, for example, used to recover the twist provided the shape is bound by some other datastream. For example, discrete heading sensors are often used to record the orientation of undersea cables at specific locations. This approach is, for example, used to find the position-dependent twist which results in a shape with the orientation recorded by the heading sensors.

For example, for a 100 m long cable in varying orientations and with randomly varying twist, an embodiment of the invention includes standard fiber optic sensors capable of measure the depth (via hydrostatic pressure induced strain) and the curvature (via the differential strain across 6 fibers arranged in a hexagonal pattern). Eq. 1 is used to recover the twist (solved, for example, via a standard non-linear optimization algorithm, fminsearch, available with the standard MATLAB software package), to compute the resulting shape estimate, and to calculate the error in the recovered shape.

Figure 11:
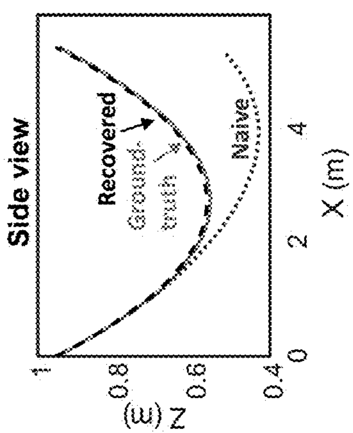
FIG. 11 is a graph of altitude versus position along a cable, as seen from a side view of the cable in a catenary geometry.
Figure 12:
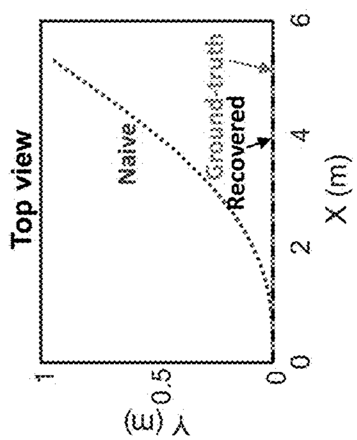
FIG. 12 is an illustrative graph of curvature versus position along the cable, as seen from a top view of the cable in a catenary geometry.
Figure 13:
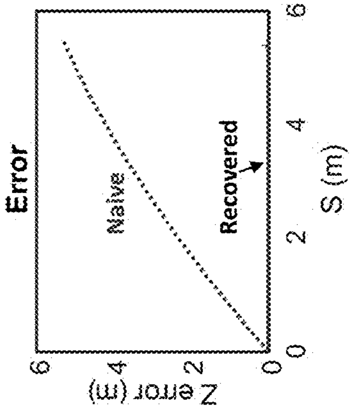
FIG. 13 is an illustrative graph of the error between the expected values based on the naïve estimate of the cable shape and the at least one respective measured value.
Figure 14:
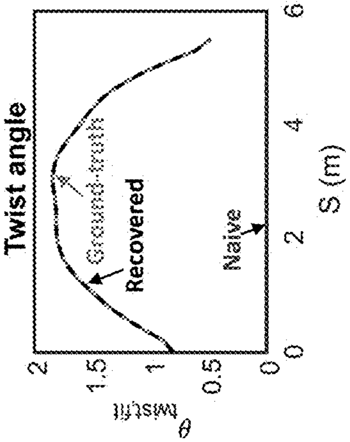
FIG. 14 is an illustrative graph of the recovered cable shape, after minimizing the aforementioned error.

Another embodiment of the invention includes a shape-sensing cable 20. According to this embodiment of the invention, the cable 20 includes 7×900 μm fibers fused together in hexagonal configuration. For ease of describing how to use this embodiment of the invention, the cable is placed, for example, in a catenary geometry between two posts with known height. In this example, the depth of the cable is calculated at each position using the known catenary geometry. For example, if the cable is placed in the atmosphere, rather than underwater, calculation of the depth of the cable precludes the use of hydrostatic pressure induced strain to infer depth. Due to non-uniformities in the cable and the force of gravity, some twist is induced in the cable, precluding a shape recovery by integration of the Frenet- Serret equations, absent application of an embodiment of the invention. In FIGS. 11-14, the dashed curve represents the ground truth of a cable's shape, the dotted curve represents an illustrative naïve estimate of the cable's shape, and the solid curve represents the recovered or reconstructed shape of the cable. FIG. 11 is a graph of altitude versus position along a cable, as seen from a side view of the cable in a catenary geometry. FIG. 12 is an illustrative graph of curvature versus position along the cable, as seen from a top view of the cable in a catenary geometry. FIG. 13 is an illustrative graph of the error between the expected values based on the naïve estimate of the cable shape and the at least one respective measured value. FIG. 14 is an illustrative graph of the recovered cable shape, after minimizing the aforementioned error. Without first recovering the twist, the naive shape varies significantly from the ground truth geometry. Yet, with recovering the twist, the reconstructed shape successfully approaches the ground truth, namely, the actual shape of the cable.

In other embodiments of the invention, optical cores of the cable do not need to be in any particular helix-like pattern. In such other embodiments of the invention, the optical cores are arrayed in a known configuration. For example, a calibration procedure is used to capture the geometric relationship between the respective cores.

An embodiment of the invention is compatible with any standard shape-sensing cable and does not require any additional hardware, provided the position or heading of the cable is known in one dimension (e.g. depth or rate of change of depth). Moreover, this embodiment of the invention is compatible with standard techniques to recover twist (e.g. using the relative strain between a central fiber and the outer fibers). Combinations of this embodiment of the invention with standard techniques to recover twist are optionally combined to provide improved accuracy.

Optionally, one or more portions of the invention operate in a standard computing operating environment, for example, a desktop computer, a laptop computer, a mobile computer, a server computer, and the like. Although the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention is described as follows. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media comprise computer storage media and communication media. Computer storage media includes non-transitory, non-volatile, removable and non-removable media implemented in any method or technology for storage of information such as computer-readable instructions, data structures, program modules or other data. Such non-transitory computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer optionally also include an input/output controller for receiving and processing input from a number of other devices, including a keyboard, mouse, sensor, load cell, transducer, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the instant invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the instant invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the instant invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. An apparatus comprising:

a cable, said cable comprising a length;

at least three curvature sensors located at at least three respective curvature sensor positions along the length of said cable and generating respective curvature values at the at least three respective curvature sensor positions;

at least one position sensor along the length of said cable and generating at least one positional value; and a processor receiving the respective curvature values from said at least three curvature sensors and receiving the respective measured positional value from said at least one position sensor, said processor recovering at least three respective angles of twist at the at least three respective curvature sensor positions at least based on the respective curvature values and the at least one respective measured positional value, wherein said cable comprises a cable shape, wherein said processor recovering the at least three angle of twists at the respective curvature sensor positions by:

generating a naïve estimate of the cable shape based on the respective curvature values and free of the at least one respective measured positional value;

generating expected positional values based on the naïve estimate of the cable shape;

correcting the naïve estimate of the cable shape by minimizing an error between the expected positional values based on the naïve estimate of the cable shape and the at least one respective measured positional value.

2. The apparatus according to claim 1, wherein said at least one position sensor comprises one of:

at least one depth sensor, wherein the respective measured positional value is a respective measured depth value; and at least one altimeter, wherein the respective measured positional value is a respective measured height value.

3. The apparatus according to claim 1, further comprising one of:

a hydrophone array comprising said cable;

a volumetric sensor array comprising said cable;

a towed array comprising said cable;

a trip line array comprising said cable; and a tethered remotely operated vehicle comprising said cable.

4. The apparatus according to claim 1, wherein each curvature sensor of said at least three curvature sensors comprises one of:

three strain sensors; and three piezo-based curvature sensors.

5. The apparatus according to claim 1, further comprising:

at least one position sensor along the length of said cable and generating at least one positional value, wherein said processor receives the respective curvature values from said at least three curvature sensors and receives the respective measured positional value from said at least one position sensor, said processor recovering at least three respective angles of twist at the at least three respective curvature sensor positions at least based on the respective curvature values and the at least one respective measured positional value.

* * * * *